United States Patent
Schroeder et al.

(10) Patent No.: US 10,691,508 B2
(45) Date of Patent: Jun. 23, 2020

(54) INTEGRATING IOT SOLUTIONS BY COMMON VOCABULARIES WITH SEMANTIC TECHNOLOGIES

(71) Applicant: SAP SE, Walldorf (DE)

(72) Inventors: Axel Schroeder, Dresden (DE); Michael Ameling, Dresden (DE); Martin Knechtel, Dresden (DE)

(73) Assignee: SAP SE, Walldorf (DE)

( * ) Notice: Subject to any disclaimer, the term of this patent is extended or adjusted under 35 U.S.C. 154(b) by 53 days.

(21) Appl. No.: 16/188,939

(22) Filed: Nov. 13, 2018

(65) Prior Publication Data

US 2020/0151030 A1    May 14, 2020

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G06F 8/51 | (2018.01) |
| H04L 12/28 | (2006.01) |
| G06F 8/41 | (2018.01) |

(52) U.S. Cl.
CPC ............ *G06F 9/541* (2013.01); *G06F 8/42* (2013.01); *G06F 8/447* (2013.01); *G06F 8/51* (2013.01); *H04L 12/281* (2013.01); *H04L 12/2814* (2013.01)

(58) Field of Classification Search
CPC .................................................... G06F 9/541
USPC ........................................................ 719/328
See application file for complete search history.

(56) References Cited

U.S. PATENT DOCUMENTS

| | | | |
|---|---|---|---|
| 8,046,326 B2 | 10/2011 | Ameling et al. | |
| 8,615,639 B2 | 12/2013 | Schroeder et al. | |
| 8,749,499 B2 | 6/2014 | Ameling et al. | |
| 9,171,252 B2 | 10/2015 | Herzig et al. | |
| 10,176,457 B2 | 1/2019 | Schroeder et al. | |
| 10,218,803 B2 | 2/2019 | Ameling | |
| 2011/0055239 A1 | 3/2011 | Wolf et al. | |

(Continued)

OTHER PUBLICATIONS

U.S. Appl. No. 15/861,857, filed Jan. 4, 2018, Jugel et al.

(Continued)

*Primary Examiner* — Timothy A Mudrick
(74) *Attorney, Agent, or Firm* — Fish & Richardson P.C.

(57) ABSTRACT

The present disclosure relates to computer-implemented methods, software, and systems for allowing Internet of Things (IoT) solutions to be integrated using common underlying vocabularies and lightweight reasoning to connect applications and validate IoT device data. In one example method, application-specific vocabularies for each of a plurality of applications are identified at design time, wherein each of the applications is associated with a corresponding vocabulary. At design time and for each application, an explicit mapping of the application-specific vocabulary of a particular application to a corresponding common vocabulary is identified. At runtime, implicit mappings between a first application and a second application to be integrated are computed based on the explicit mapping of the application-specific vocabulary of the first application to the common vocabulary and the explicit mapping of the application-specific vocabulary of the second application to the common vocabulary.

20 Claims, 7 Drawing Sheets

(56) References Cited

U.S. PATENT DOCUMENTS

| | | | |
|---|---|---|---|
| 2011/0298724 A1 | 12/2011 | Ameling et al. | |
| 2011/0321154 A1 | 12/2011 | Dau et al. | |
| 2012/0158603 A1 | 6/2012 | Ameling et al. | |
| 2012/0246405 A1 | 9/2012 | Schroeder et al. | |
| 2012/0254579 A1 | 10/2012 | Schroder et al. | |
| 2013/0159339 A1 | 6/2013 | Thomsen et al. | |
| 2013/0162519 A1 | 6/2013 | Ameling et al. | |
| 2013/0194271 A1 | 8/2013 | Roesch et al. | |
| 2013/0232255 A1* | 9/2013 | Fukui | H04L 43/10 709/224 |
| 2013/0246996 A1* | 9/2013 | Duggal | G06F 8/35 717/104 |
| 2014/0051506 A1 | 2/2014 | Ameling et al. | |
| 2015/0160018 A1 | 6/2015 | Ameling et al. | |
| 2015/0324101 A1 | 11/2015 | Roesch et al. | |
| 2015/0328550 A1 | 11/2015 | Herzig et al. | |
| 2016/0006815 A1* | 1/2016 | Dong | G06F 9/46 709/204 |
| 2016/0019288 A1 | 1/2016 | Knechtel | |
| 2016/0294619 A1 | 10/2016 | Schroder et al. | |
| 2016/0308861 A1 | 10/2016 | Ameling et al. | |
| 2016/0378327 A1 | 12/2016 | Schroeder et al. | |
| 2017/0193017 A1* | 7/2017 | Migliori | G06F 16/1724 |
| 2018/0054327 A1 | 2/2018 | Ameling | |
| 2018/0102950 A1 | 4/2018 | Ameling | |
| 2018/0139322 A1 | 5/2018 | Knechtel et al. | |
| 2018/0144614 A1 | 5/2018 | Knechtel et al. | |
| 2018/0159740 A1 | 6/2018 | Knechtel et al. | |
| 2018/0197086 A1 | 7/2018 | Schroeder et al. | |
| 2019/0034285 A1 | 1/2019 | Knechtel et al. | |

OTHER PUBLICATIONS

U.S. Appl. No. 16/188,939, filed Nov. 13, 2018, Schroeder et al.
U.S. Appl. No. 16/206,230, filed Nov. 30, 2018, Ameling et al.
U.S. Appl. No. 16/217,521, filed Dec. 12, 2018, Schroeder et al.

Baader et al., "The Description Logic Handbook: Theory, Implementation, and Applications," Cambridge University Press, Jan. 2003, 574 pages.

Cordis.Europa.eu [online], "Enabling Business-based Internet of Things and Services—An Interoperability Platform for a Real-world Populated Internet of Things Doman," Project Information: Fact Sheet, Apr. 21, 2017, [retrieved on Mar. 12, 2019], retrieved from: URL<https://cordis.europa.eu/project/rcn/96598/factsheet/en>, 2 pages.

Cordis.Europa.eu [online], "Final Report Summary—APPS4AME (Engineering Apps for Advanced Manufacturing Engineering," Project Information: Reporting, Jun. 3, 2016, [retrieved on Mar. 12, 2019], retrieved from: URL<https://cordis.europa.eu/project/rcn/105653/reporting/en>, 15 pages.

Digital.NHS.uk [online], "SNOMED CT," NHS Digital Systems and Services: Terminology and Classifications, Jan. 10, 2019 (last edited), [retrieved on Mar. 12, 2019], retrieved from: URL<https://digital.nhs.uk/services/terminology-and-classifications/snomed-ct>, 5 pages.

Help.SAP.Com [online], "Event Type," SAP IoT Application Enablement Services, [retrieved on Mar. 12, 2019], retrieved from: URL<https://help.sap.com/viewer/350cb3262cb8496b9f5e9e8b039b52db/1.44.0.0/en-US/d84502c46857452f8b46447a51978256.html>, 5 pages.

Help.SAP.Com [online], "Property Type," SAP IoT Application Enablement Services, [retrieved on Mar. 12, 2019], retrieved from: URL<https://help.sap.com/viewer/350cb3262cb8496b9f5e9e8b039b52db/1.44.0.0/en-US/9f52e11816854086a75c208c88d826a6.html?q=property>, 3 pages.

Help.SAP.Com [online], "SAP Cloud Platform Internet of Things," Feb. 14, 2019, [retrieved on Mar. 12, 2019], retrieved from: URL<https://help.sap.com/viewer/2f1daa938df84fd090fa2a4da6e4bc05/Cloud/en-US/724057d3064d4553ba198d76636e425b.html>, 10 pages.

Wikipedia.com [online], "SNOMED CT," Wikipedia Reference, Feb. 28, 2019 (last edited), [retrieved on Mar. 12, 2019], retrieved from: URL<https://en.wikipedia.org/wiki/SNOMED_CT#Use>, 10 pages.

* cited by examiner

INTEGRATING IOT SOLUTIONS BY COMMON VOCABULARIES WITH SEMANTIC TECHNOLOGIES

TECHNICAL FIELD

The present disclosure relates to computer-implemented methods, software, and systems for allowing Internet of Things (IoT) solutions to be integrated using common underlying vocabularies and lightweight reasoning to connect applications and validate IoT device data.

BACKGROUND

Internet of Things solutions consist of many different applications and devices, each using different vocabularies for similar and/or related information and data. For example, enterprise applications may bring their explicit or implicit domain model regardless and without consideration of a particular IoT solution, as those enterprise applications are usually designed apart from an IoT implementation. In order to allow for communication between different systems, a specific 1:1 mapping of terms and syntax must be defined to allow the disparate systems communicate throughout a process. Further, each connected application also needs to explicitly define a mapping connection to each of the other applications and devices to which it is connected or with which it plans to communicate in order to allow for understanding of future communications.

SUMMARY

The present disclosure involves systems, software, and computer-implemented methods for integrating IoT solutions and applications using a common underlying vocabulary linked to the solution- and application-specific vocabularies. One example system includes at least one processor and instructions causing the at least one processor to perform various operations, including one or more example methods. In one example method, application-specific vocabularies for each of a plurality of applications are identified at design time, wherein each of the applications is associated with a corresponding vocabulary. At design time and for each application, an explicit mapping of the application-specific vocabulary of a particular application to a corresponding common vocabulary is identified. At runtime, implicit mappings between a first application and a second application to be integrated are computed based on the explicit mapping of the application-specific vocabulary of the first application to the common vocabulary and the explicit mapping of the application-specific vocabulary of the second application to the common vocabulary.

Implementations can optionally include one or more of the following features. In some instances, computing the implicit mappings between the first application and the second application is performed in response to receiving, at the second application, a request including a message from the first application.

In some instances, computing the implicit mappings between the first application and the second application is performed in response to a connection being established between the first application and the second application.

In some instances, computing the implicit mappings between the first application and the second application includes identifying the first application and the second application to be integrated, identifying the application-specific vocabulary and predefined mapping to the common vocabulary for each of the first application and the second application, and computing the implicit mapping between the vocabularies of the first and second application based on the identified mappings between the identified application-specific vocabulary and the common vocabulary.

In some instances, identifying, at design time and for each application, the explicit mapping of the application-specific vocabulary of a particular application to a corresponding common vocabulary comprises identifying, for a first application, an explicit mapping of the application-specific vocabulary of the first application to a first common vocabulary, and identifying, for a second application, an explicit mapping of the application-specific vocabulary of the second application to a second common vocabulary different than the first common vocabulary. At design time, a mapping of the first common vocabulary to the second common vocabulary is also identified. In those instances, the mapping of the first common vocabulary to the second common vocabulary comprises an explicit mapping of the first common vocabulary to the second common vocabulary, and computing, at runtime, the implicit mappings between a first application and a second application to be integrated based on the explicit mapping of the application-specific vocabulary of the first application to the common vocabulary and the explicit mapping of the application-specific vocabulary of the second application to the common vocabulary comprises computing the implicit mappings between the first application and the second application based on the explicit mapping of the application-specific vocabulary of the first application to the first common vocabulary, the explicit mapping of the application-specific vocabulary of the second application to the second common vocabulary, and the explicit mapping of the first common vocabulary to the second common vocabulary.

In some instances, the application-specific vocabularies of the first application comprises a first data model and the application-specific vocabularies of the second application comprises a second data model, where the first data model is different than the second data model.

In some instances, no explicit mapping between applications are identified.

In some instances, the computed implicit mappings are transmitted to a review system for review and potential correction of the computed implicit mappings. A correction to at least one of the computed implicit mappings is received from the review system, and the correction to the at least one of the computed implicit mappings can be used for further operations. In some of those instances, transmitting the computed implicit mappings to a review system for review and potential correction of the computed implicit mappings occurs in response to an error occurring in relation to a particular computed implicit mapping, and wherein the correction is performed at runtime.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
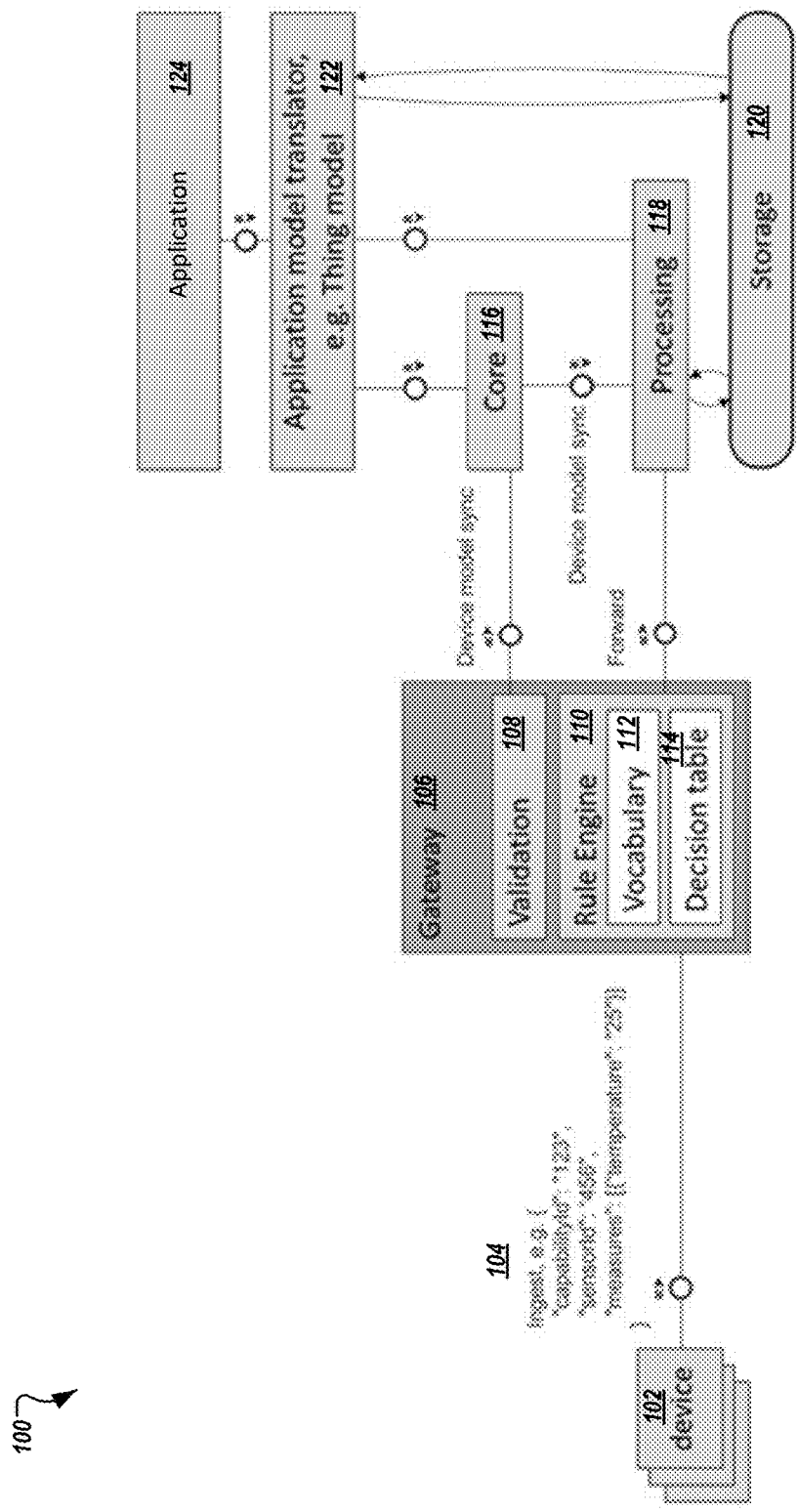
FIG. 1 presents an example set of components in a cloud IoT system and its integration with other services and applications.

The present disclosure describes various tools and techniques associated with integrating Internet of Things (IoT) solutions and applications using a common underlying vocabulary linked to the solution- and application-specific vocabularies. In one example system, IoT devices can submit their sensor temperature values to a communication gateway, which can interpret and filter received information, and forward relevant information to a central processing and storage component. A rule engine can evaluate and trigger actions, such as when specific temperature thresholds are exceeded. A persistency service can store the data and provide interfaces for data consumption by one or more applications. The data can pass multiple software solutions that need to speak or communicate in specific languages or vocabularies in order to interpret and evaluate the semantics of the data correctly. Currently, no standardized dictionaries or interfaces are available to provide such functionality or communications. As such, integrating two or more software solutions with each other requires custom implementations and mappings, which lead to increasing communication efforts, error-proneness, and the risk of semantical misunderstanding as the meaning of various terms within one component's vocabulary may not be equivalent to another component's respective vocabulary, resulting in misunderstandings and errors.

The solution described herein proposes using ontological and semantic technologies to provide a common underlying vocabulary and lightweight reasoning to infer, sometimes at runtime, logical conclusions and translations to easily connect applications and validate IoT device data from source to sink to application. Based on mappings defined between particular applications and devices to the common vocabulary, automated systems can provide seamless translations between different component-specific vocabularies without requiring those components to generate or be associated with component-to-component specific mappings. That is, instead of n:m mappings (e.g., one mapping between each combination of applications or other components), the present solution can allow for, in a best case, 1:n mappings (e.g., one mapping of each component to a common vocabulary). In some instances, multiple common vocabularies may be available and can be connected or mapped to one another. In those instances, the number of mappings may be limited to 1:n+x, where x represents the mappings between various common vocabularies. Using implicit translations via the mapped common vocabularies, fewer mappings and automatic translations can be realized.

In current solutions, enterprise applications may be associated with their own explicit or implicit domain model, as they are designed for specific business purposes and have not been linked to particular IoT infrastructures. Similarly, IoT platforms are not built with specific enterprise applications in mind, and may use a different vocabulary. To transport data through the underlying device model of particular IoT devices into applications (e.g., IoT applications for consuming particular device data), data needs to be translated between all involved device and domain models. As noted, previously this was done by manually creating a mapping at each level and between each model.

FIG. 1 presents an example set of components in a cloud IoT system and its integration with other services and applications. As illustrated, an IoT device 102 can send a set of measured values with references to the device's specific device model. In this case, the device's ingest message 104 can include references to a capabilityID of "123", a sensorID of "456", and measures related to a property name of "temperature", along with a value of "25". Vocabulary translation occurs at various places within the illustrated architecture 100, and is done based on 1:1 mappings between the various components.

The gateway 106 receives the message 104 and validates it using validation processing 108. During validation, device references are checked against existing device model entities at core 116. During design time, the device model must be modeled explicitly (e.g., via an API) and is stored in core 116 and can be synced to the gateway 106. As illustrated, the gateway 106 contains a rule engine 110 for data cleansing and filtering. For example, the rule engine 110 can filter messages and allows for triggering of further events, such as sending an email or other communication when defined thresholds associated with particular devices are exceeded. The rule engine 110 may be defined with a specific vocabulary 112 that is used within a decision table 114 to determine whether particular rules are met. For example, the rule engine 110 may process events in a specified input format. One example may include a format such as:

[{
"_type_": "Device",
"DeviceId": "2",
Timestamp: 2017-08-04 01:06:36,
"SensorBConfig1": "SensorBConfig1"
}, {
"_type_": "SensorNumber",
"SensorConfigId": "SensorBConfig1",
"MeasureValue": "25"
}]

As the naming of various values and data show, one can derive that Device, DeviceId, SensorNumber, SensorConfigId and MeasureValue each have a mapping to the device model. In current solutions, as long as this mapping is hard-coded in the implementation, the modeler will have to validate the keys when modeling vocabulary and rules to match the exact spelling of the names to provide for correct syntactical, and not simply semantical, mapping. Because of this requirement, any errors in specific mappings may cause a translation to fail or become inconsistent.

One or more applications 124 can access APIs from IoT solutions, and can access storage 120 directly as depicted in FIG. 1. These applications 124 may also have their own vocabulary, and in some instances, may bring their own storage. One example application may be an IoT Application Enablement application, which uses a Thing Model for its own vocabulary or purposes. The Thing Model can be mapped directly to a device model used for the gateway 106, with the modeling between the systems done manually. When multiple applications are used having differing models and vocabularies, a requirement to model N:M relationships between entities would occur. While some entities can be easily mapped syntactically since they are common in naming, e.g. the Thing Model 'Property' to a device model's 'Property', domain-specific background knowledge of other entities must be used to map other entities, e.g., mapping an Event Type of the gateway 106 to a Capability of the device model in order to model a notification.

In such an example, an Application Enablement Services Event type may have a format of the following:
{
"name": "temperature event",
"propertySets":[{"id": "message", "propertySetType":"string"}]
}

That event type can then be mapped to a cloud platform's IoT capability description of:
{
"name":"temperature event",
"properties":[{"datType":"STRING","name":"message"}]
}

Figure 2:
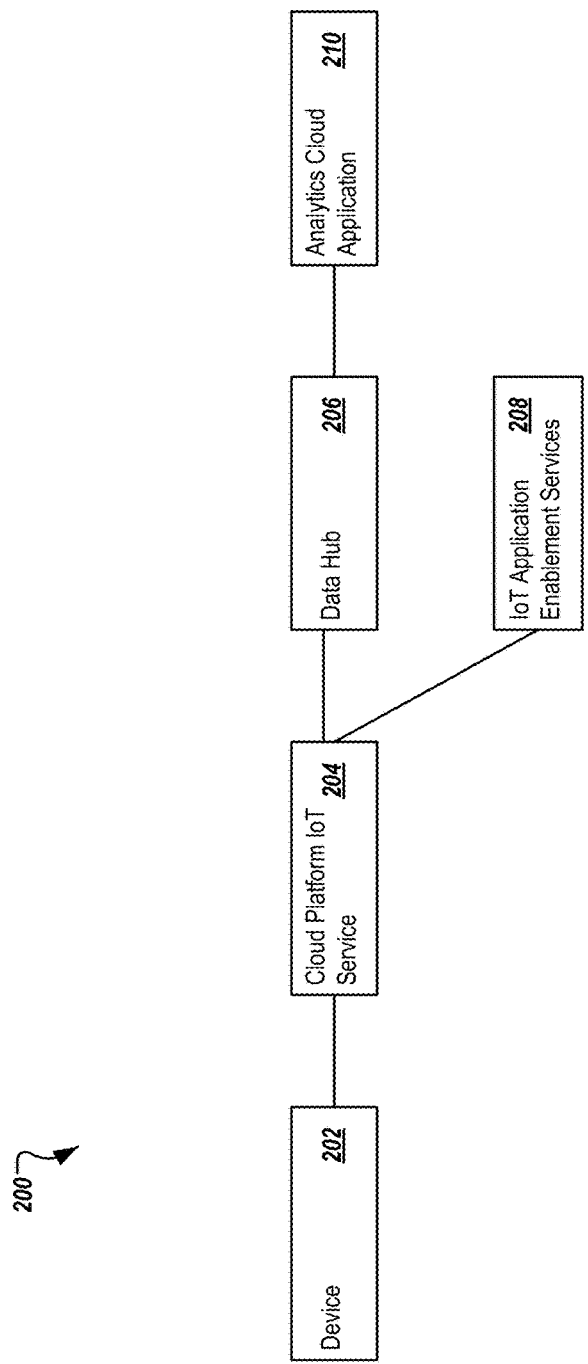
FIG. 2 illustrates a use case including the integration of multiple different IoT products and services at the same time.

FIG. 2 shows a more complex but common use-case which includes the integration of multiple different products and services at the same time. Each application or service can use its own data model, and must be mapped individually against the model of the targeted application or service. As illustrated, device 202 sends data and messages to the cloud platform IoT service 204. The IoT service 204 must establish a specific mapping between the device model of device 202 and its own model. Because the IoT service 204 then connects to both data hub 206 and the IoT application enablement services 208, two additional mappings must be defined for the IoT service 204. The data hub 206 must also generate mappings to both the IoT service 204 and the analytics cloud application 210. In other words, each component must create a specific mapping to any other components to which it intends or is meant to communicate. Such requirements make detailed implementations of linked systems difficult to implement, as the modeling and mapping is usually performed at design time and is created manually.

The present application proposes a solution to these problems in current systems. Instead of mapping a particular component's model to another component's model, each component can map their respective model or vocabulary to a common vocabulary independent from any particular specific implementation. Interactions and information defined for a particular component can be translated using the common vocabulary, which can then be translated into any other specific model or vocabulary associated with another component. With each component translating into a common vocabulary, components will become independent from the specific implementation and can be easily exchanged. The proposed mapping would also allow components to talk directly to a device with instructions or responsive communications.

The proposed mappings can be performed on different levels, such as from one platform to another platform, or between different applications. For the second option, no mapping may need to be defined in the platform. In other words, a source platform can simply forward its data to a target platform, which forwards the payload to the receiving application. Such a solution implies a 1:n mapping from 1 source platform to n target applications, causing much more effort than mapping between a single source platform to a single target platform. In other words, the mapping problem can be moved from the platform to the application.

A novel and lightweight approval provided herein does not require that all components tie themselves to an underlying common vocabulary upon their creation. Instead, the vocabulary of every application model, including those newly created or previously existing, can be mapped to a common vocabulary, such as a specific lexicon or industry standard. Using those mappings to a common base, standard reasoners and other translation components can compute the n:m mappings between specific vocabularies or ontologies.

Figure 3:
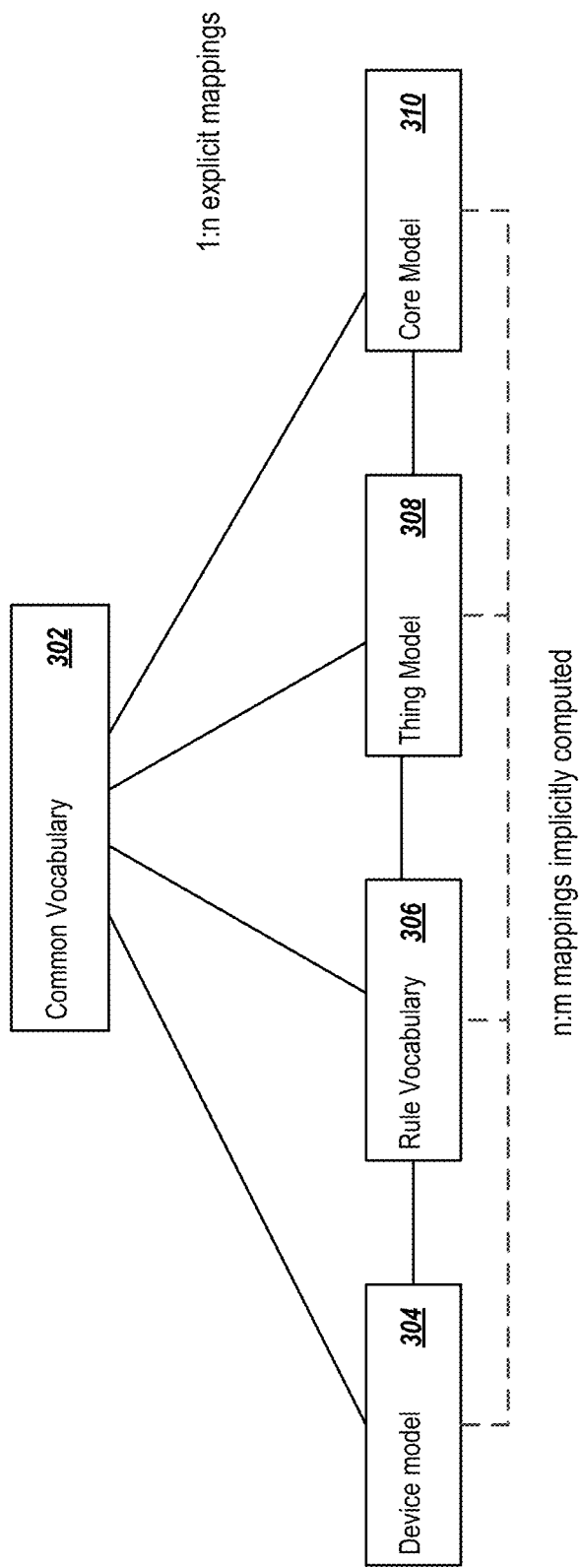
FIG. 3 illustrates an example of multiple domain vocabularies in an IoT system connected to a single common vocabulary.

FIG. 3 shows multiple domain vocabularies, e.g. the IoT Device Model 304, rule vocabulary 306, thing model 308, and core model 310. Each of the models is explicitly mapped to one common vocabulary 302. The models can also be associated with a physical model (not shown) that represents the real world, such as real devices with real sensors, that are not yet digitally represented in an information system. Thus, those physical models cannot be mapped to the common vocabulary. As such, the first step to include those physical devices is to model the physical world by creating a model that can be mapped to other models.

As illustrated by FIG. 3, each of the models are associated with a single mapping to the common vocabulary 302. Using that mapping, each of the models and their related systems (e.g., using an API, a particular service, a specific translation component, etc.) can translate information into their respective vocabulary using the underlying common vocabulary 302. In some instances, a first component sending to a second component may perform the translation before the information is sent. In other instances, the first component can send its information first, where the second component can perform the translation upon receipt. In either event, 1:n mappings are created to the common vocabulary, which can then result in, based on the ability of to perform the translations, n:m mappings being implicitly computed.

Figure 4:
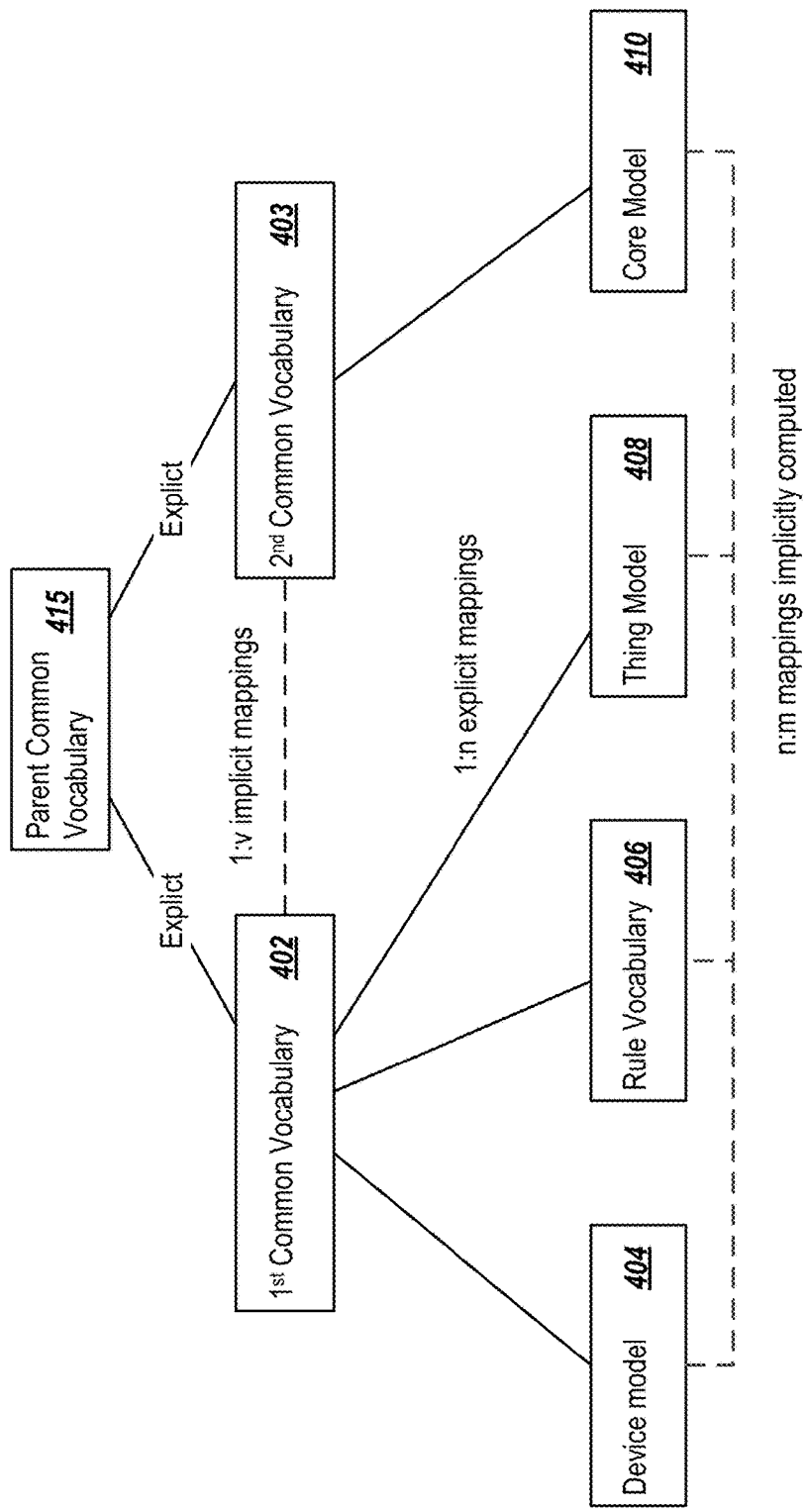
FIG. 4 illustrates an example of multiple domain vocabularies in an IoT system connected to two different common vocabularies.

FIG. 4 shows multiple domain vocabularies connected to two different common vocabularies 402 and 403. As illustrated, the device model 404, rule vocabulary 406, and thing model 408 have been specifically mapping to a first common vocabulary 402. The core model 410 has been mapped to a second common vocabulary 403. Each of the first common vocabulary 402 and the second common vocabulary 403 are explicitly mapped to a parent common vocabulary 415, such that an implicit connection between each of the common vocabularies 402 and 403 (along with any other v vocabularies) can be calculated (e.g., at runtime, at certain intervals, etc.). In some instances, some or all of the components may calculate translations between one or more other components, and can store translations or information on how to translate particular information received from or to be sent to another particular component.

Figure 5:
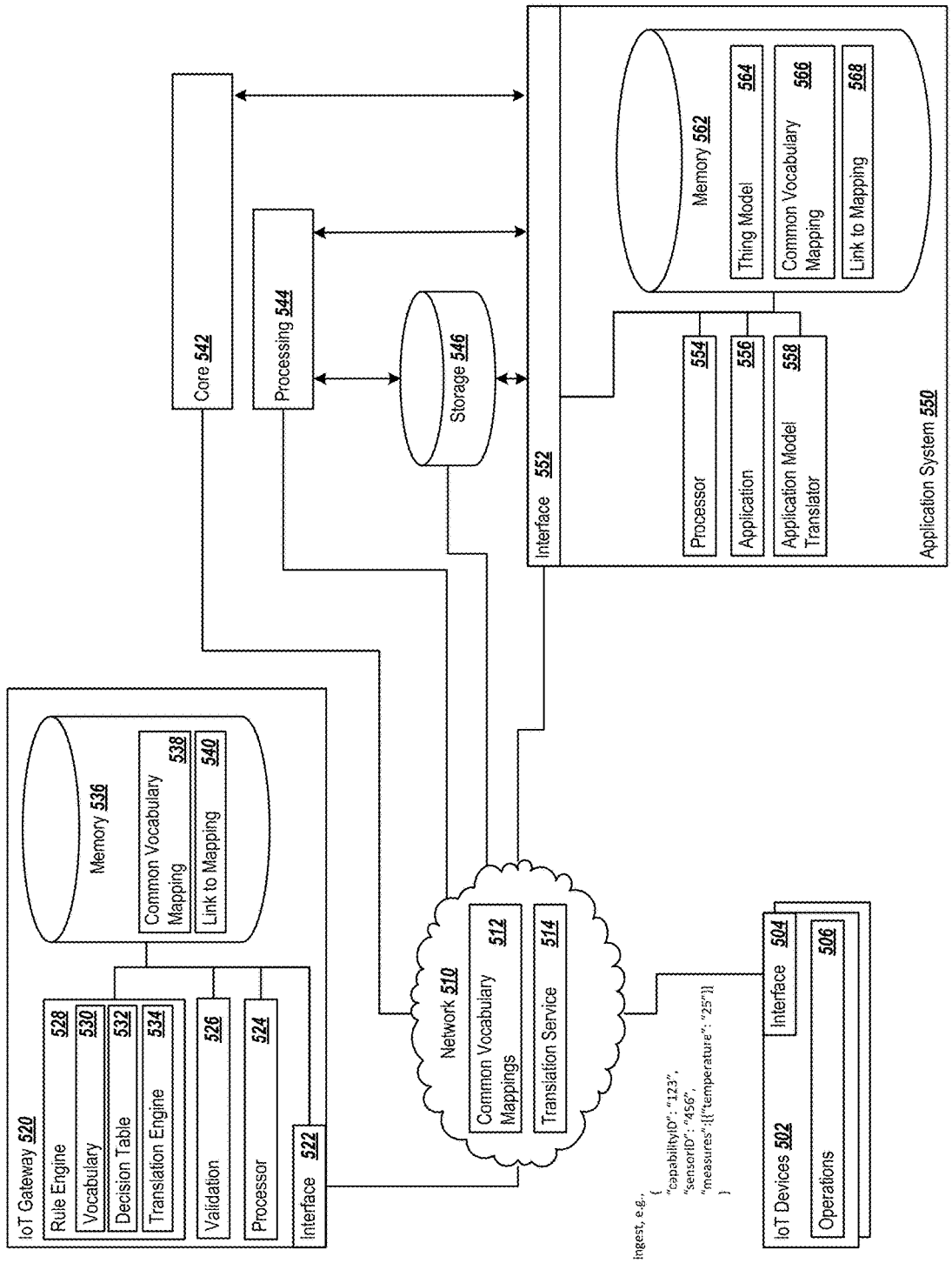
FIG. 5 is a block diagram illustrating a system for integrating systems associated with an IoT solution using mappings from components to one or more common vocabularies.

Turning to the illustrated example implementation, FIG. 5 is a block diagram illustrating a system 500 for integrating systems associated with an IoT solution using mappings from components within the solution to one or more common vocabularies. System 500 includes functionality and structure associated with selected components in an example IoT system, including integration between services and applications internal and external to the IoT solution itself. Each of the components associated with a specific data model, including one or more IoT devices 502, an IoT gateway 520, and an application service 502, are mapped, at design time, to one or more common vocabularies, where the common vocabularies provide a consistent underlying basis for allowing translations between the components. Using the connections to the common vocabularies, translation engines, services, and/or techniques can be applied at runtime to automatically translate between different components without requiring specific component-to-component mappings to be explicitly defined.

As illustrated, system 500 includes or is communicably coupled with one or more IoT devices 502, an IoT gateway 520, and an application system 550, each connected via network 510. As illustrated, the IoT gateway 520 may also have access to a core 542, processing 544, and storage 546 for performing associated operations and storing related information from the IoT gateway 520, which may be accessible to the application system 502 directly or via network 510. System 500 is a single example of possible implementations, with alternatives, additions, and modifications possible for performing some or all of the described operations and functionality. Although shown separately, in some implementations, functionality of two or more systems, servers, or illustrated components may be provided by a single system or server. In some implementations, the functionality of two or more systems, servers, or illustrated components may be provided by a single component, system, or server. In some implementations, the functionality of one illustrated system or server may be provided by multiple systems, servers, or computing devices, including those physically or logically local or remote to each other. Any combination or permutation of systems may perform the functionality described herein.

As used in the present disclosure, the terms "computer" or "computing device" are intended to encompass any suitable processing device. For example, IoT gateway 520 and the application system 550 may be any computer or processing device (or combination of devices) such as, for example, a blade server, a general-purpose personal computer (PC), MAC, workstation, UNIX-based workstation, embedded system or any other suitable device. Moreover, although FIG. 5 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. For example, IoT gateway 520 may be any system which can request data, execute an application (e.g., rule engine 528 and validation module 526), and/or interact with the IoT devices 502 and application system 550. The IoT gateway 520, in some instances, may be any other suitable device, including a mobile device, such as a smartphone, a tablet computing device, a smartwatch, a laptop/notebook computer, a connected device, or any other suitable device. Additionally, the IoT gateway 520 may be a desktop or workstation, server, or any other suitable device, or may be represented as a cloud-based system accessible as a web or other remote service. Similarly, the application system 550 may be a server or a set of servers, a cloud-based application or system, or any other suitable system. In some instances, the IoT gateway 520 may execute on or be associated with a system executing the application system 550. In general, each illustrated component may be adapted to execute any suitable operating system, including Linux, UNIX, Windows, Mac OS®, Java™, Android™, Windows Phone OS, or iOS™ among others. Each of the IoT devices 502 may similarly be any suitable computing device, which can provide IoT-related information to the IoT gateway 520 and other components of the illustrated system 500.

In general, each of the IoT devices 502 may receive or generate information associated with performance of a device, function, or sensor. The operations 506 of a particular IoT device 502 can cause the device 502 to perform any suitable function, from generating a message associated with detected values or states of the device 502 or other devices, which the IoT device 502 is monitoring, to modifying operations of the IoT device 502. The device 502 can communicate with one or more systems, including an IoT gateway 520, via interface 504. As illustrated, an ingest message is received identifying a particular capability ID, a sensor ID, and a set of measures.

Interface 504 is used for communicating with other systems in a distributed environment—including within the system 500, connected to the IoT device 502 and/or network 510, as well as other systems or components communicably coupled to the network 510. Generally, the interface 504 includes logic encoded in software and/or hardware in a suitable combination and operation to communicate with the network 510 and other communicably coupled components. More specifically, the interface 504 may comprise software supporting one or more communication protocols associated with communications such that the IoT device 502, network 510, and/or interface's hardware is operable to communicate physical signals within and outside of the illustrated system 500.

Network 510 facilitates wireless or wireline communications between the components of the system 500 (e.g., between combinations of the one or more IoT devices 502, the IoT gateway 520, application system 550, and/or other components, among others) as well as with any other local or remote computer, such as additional mobile devices, clients, servers, remotely executed or located portions of a particular component, or other devices communicably coupled to network 510, including those not illustrated in FIG. 5. In this illustrated environment, the network 510 is depicted as a single network, but may be comprised of more than one network without departing from the scope of this disclosure, so long as at least a portion of the network 510 may facilitate communication between senders and recipients. In some instances, one or more of the illustrated components (e.g., the IoT gateway 520 and/or the application system 550) or portions thereof (e.g., the rule engine 528, the translation engine 534 or the translation service 514, various portions of any of the memories 536, 562, or other portions) may be included within network 510 as one or more cloud-based services or operations. The network 510 may be all or a portion of an enterprise or secured network, while in another instance, at least a portion of the network 510 may represent a connection to the Internet. In some instances, a portion of the network 510 may be a virtual private network (VPN) or an Intranet. Further, all or a portion of the network 510 can comprise either a wireline or a wireless link. Example wireless links may include 802.11a/b/g/n/ac, 802.20, WiMax, LTE, and/or any other appropriate wireless link. In other words, the network 510 encompasses any internal or external network, networks, sub-network, or combination thereof operable to facilitate communications between various computing components inside and outside the illustrated system 500. The network 510 may communicate, for example, Internet Protocol (IP) packets, Frame Relay frames, Asynchronous Transfer Mode (ATM) cells, voice, video, data, and other suitable information between network addresses. The network 510 may also include one or more local area networks (LAMs), radio access networks (RANs), metropolitan area networks (MANs), wide area networks (WANs), all or a portion of the internet and/or any other communication system or systems at one or more locations.

As illustrated, network 510 includes a set of common vocabulary mappings 512 and a translation service 514. The common vocabulary mappings 512 may represent a particular common vocabulary or multiple vocabularies to which the vocabularies of data models used by other components (e.g. the IoT devices 502, the IoT gateway 520, the application system 550, etc.) are mapped. For n devices, only n mappings are required. Using the common vocabulary mappings 512 and a translation service 514 (or, for example, a translation engine 534 or an application model translator 558, among others), connections and translations between each of the n devices can be made at runtime. The common vocabulary mappings 512 may be defined at design time, and can be stored at a centralized location (e.g., within network 510), distributed among locations including stored at various components at which translations are to be performed, or made available at a remote location accessible by a particular uniform resource identifier. In some instances, a common vocabulary service (not shown) may be provided, where translation components are able to access and derive particular mappings using the underlying common vocabularies. The translation service 514 may be any suitable service able to identify a first data model associated with a set of information and a source component and a second data model associated with a target component. The translation service 514 can translate the set of information from the vocabulary of the first data model into the vocabulary of the second data model based on the common connections to the common vocabulary mappings 512.

As illustrated, the IoT gateway includes an interface 522, one or more processors 524, a validation module 526, a rule engine 528, and memory 536. Different implementations may include additional or alternative components, with FIG. 5 meant to be an example illustration of one possible illustration. While illustrated separate from one another, at least of these components, in particular the rule engine 528 and memory 536 may be combined within a single component or system, or may be implemented separate from one another, including at different systems and/or at remote components.

Interface 522 may be similar to or different from interface 504, and is used by the IoT gateway 520 for communicating with other systems in a distributed environment—including within the system 500—connected to the IoT gateway 520 and/or network 510, as well as other systems or components communicably coupled to the network 510.

The IoT gateway 520 can receive information from the one or more IoT devices 502, either directly from the IoT devices 502 themselves, or via network 510. The IoT gateway 520 can receive the information (e.g., the ingest message) and can validate the messages using a validation component 526. During validation, device references are checked against existing device model entities. During design time, for example, the device model is modeled explicitly and is stored in core 542. The device model can be synced to the IoT gateway 520 for use during the validation processes. A particular solution may include multiple gateways in a distributed system.

The rule engine 528 can be used for data cleansing and filtering. The rule engine 528 can filter messages received from the IoT devices 502 and can trigger further events based on those messages. For example, if a received message includes measures that exceed a certain threshold (e.g., a temperature above 50 degrees Celsius), a message or email can be triggered. The rule engine 528 can include its own particular and specific vocabulary 530 used in its processing and to generate particular messages. Similarly, decision table 532 can be used to determine how a particular message or set of messages is to be processed and/or acted upon. To do so, however, the information received from the IoT device 502 must be translated into a format understood by the IoT gateway 520. To do so, the translation engine 534 can identify the information received from the IoT device 502, identify the IoT device's device model as mapped to the common vocabulary 538, and determine how the information is to be translated into the vocabulary of the rule engine 528.

As noted, the IoT gateway 520 may be any suitable computing device, and may include one or more processors 524. Although illustrated as a single processor 524 in FIG. 5, multiple processors may be used according to particular needs, desires, or particular implementations of the system 500. Each processor 506 may be a central processing unit (CPU), an application specific integrated circuit (ASIC), a field-programmable gate array (FPGA), or another suitable component. Generally, the processor 506 executes instructions and manipulates data to perform the operations of the IoT gateway 520, in particular, those related to executing the various modules or software illustrated therein (e.g., validation module 526, rule engine 528, etc.) and their related functionality. Specifically, the processor 524 executes the algorithms and operations described in the illustrated figures, as well as the various software modules and functionalities, including the functionality for sending communications to and receiving transmissions from the IoT devices 502, as well as to process and prepare responses to received input associated with an interface 522. Each processor 524 may have a single core or multiple cores, with each core available to host and execute an individual processing thread.

Regardless of the particular implementations, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

As illustrated, the IoT gateway 520 includes or is associated with memory 536. In some implementations, the IoT gateway 520 includes a single memory or multiple memories. The memory 536 may include any type of memory or database module and may take the form of volatile and/or non-volatile memory including, without limitation, magnetic media, optical media, random access memory (RAM), read-only memory (ROM), removable media, or any other suitable local or remote memory component. The memory 536 may store various objects or data, include caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the IoT gateway 520. Additionally, the memory 536 may store any other appropriate data, such as VPN applications, firmware logs and policies, firewall policies, a security or access log, print or other reporting files, as well as others. As illustrated, memory 536 includes, for example, a common vocabulary mapping 538 and/or a link to a mapping location 540. Memory 536 may be local to or remote to the IoT gateway 520, and may be available remotely via network 510, as a cloud-based storage in network 510, or an alternative connection in such instances where not locally available. Further, some or all of the data in memory 536 in FIG. 5 may be located outside of the IoT gateway 520, including within network 510 as cloud-based storage and data.

Similar to common vocabulary mappings 512, the common vocabulary mappings 538 may be or may represent a mapping of the rule engine's vocabulary 530 to a particular common vocabulary. In some instances, the common vocabulary mapping 538 may also make available information about mappings from one or more other data models to the common vocabulary. In some instances, the common vocabulary mapping 538 may only identify how the rule engine vocabulary 530 is mapped to a common vocabulary, with information on other component model mappings being stored elsewhere. The translation engine 534 can receive a message from another component, access the common vocabulary mapping 538 to determine a mapping between the particular data model of that component and the common vocabulary, a particular IoT device 502, and translate the received message The common vocabulary mappings 512 may represent a particular common vocabulary or multiple vocabularies to which the vocabularies of data models used by other components (e.g. the IoT devices 502, the IoT gateway 520, the application system 550, etc.) are mapped. For n devices, only n mappings are required. Using the common vocabulary mappings 512 and a translation service 514 (or, for example, a translation engine 534 or an application model translator 558, among others), connections and translations between each of the n devices can be made at runtime. The common vocabulary mappings 512 may be defined at design time, and can be stored at a centralized location (e.g., within network 510), distributed among locations including stored at various components at which translations are to be performed, or made available at a remote location accessible by a particular uniform resource identifier. In some instances, a common vocabulary service (not shown) may be provided, where translation components are able to access and derive particular mappings using the underlying common vocabularies. The translation service 514 may be any suitable service able to identify a first data model associated with a set of information and a source component and a second data model associated with a target component. The translation service 514 can translate the set of information from the vocabulary of the first data model into the vocabulary of the second data model based on the common connections to the common vocabulary mappings 512. In some instances, two translations may be used—from the first data model to the common vocabulary and then from the common vocabulary to the second data model. In other instances, however, a single transformation can be performed by the translation engine 534 such that the first model and the second model are connected via the common vocabulary, and the first model can be translated directly into the second model. In some instances, mapping information may be stored apart from the IoT gateway 520. In such instances, a link to the mappings 540 can be provided, allowing the translation engine 534 access to those mappings for translation purposes. Alternatively, in some instances, the translation engine 534 may perform a call to a remote data set and/or service, such as the common vocabulary mappings 512 and/or translation service 514 to perform the appropriate translations.

As illustrated, application system 550 can perform operations and advanced interactions with IoT data generated by the IoT devices 502 and with operations performed by the IoT gateway 520. In some instances, an application system 550 can interact with stored IoT data included in storage 546 (as stored there by the IoT gateway 520) to perform additional operations and functionality based on the data. In some instances, the application 556 may monitor storage 546 for messages, events, and/or specific data, and can take action based on that information. The application system 550 and application 556 can perform functionality associated with one or more interfaces IoT gateways 520 and one or more IoT devices 502. The operations can perform any suitable interactions and processing of IoT-based data. Each application system 550 or application 556 can interact with different or the same sets of data and each application 556 may use a different data model. As illustrated in FIG. 5, the application 556 is associated with a thing model 564. The thing model 564 represents a data model of the application 556, and can be mapped, at runtime, to a common vocabulary. The mapping can be stored as the common vocabulary mapping 566 in memory 562 of the application system 550, or the mapping may be stored remotely and accessed through a link to the mapping 568.

As illustrated, application system 550 includes interface 552, at least one processor 554, application 556, application model translator 558, and memory 562. Interface 552 may be similar to or different from interface 522, and can be used to communicate with other communicably connected components within and external to system 500. Processor 554 may be similar to or different from processor 524, and can execute one or more applications 556 and, when separate from the application 556, an application model translator 558. The application model translator 558 can perform similar operations as the translation engine 534 and the translation service 514 to identify, at runtime, a connection between disparate vocabularies connected by a common underlying vocabulary or combination of vocabularies. Memory 562 may be similar to or different from memory 536, and can store information and data relevant to the application system 550 and the one or more applications 556.

In some instances, the various components may be associated with one or more administrators or users who can establish, at design time, connections from the various data models to the common vocabulary. The connections or mappings may be defined using any suitable software tool, such as an ontology editor (e.g., Protégé) and a corresponding reasoner (e.g., jcel), which can perform and compute the mappings. In some instances, once mappings to the common vocabulary are generated, further automated calculated mappings may be determined and then stored, such as at the various common vocabulary mappings 512, 538, 566. Those mappings may be stored before a translation is to be performed in some instances, and the translation information can be readily available. In other instances, the connections may be derived at runtime when a particular translation is to be performed, and may be limited to a determination of a particular translation from one model to another. In still other instances, calculated conversions can be stored in a cached or other memory, and can be accessed to allow for cached conversions of terms when required.

While portions of the elements illustrated in FIG. 5 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 6:
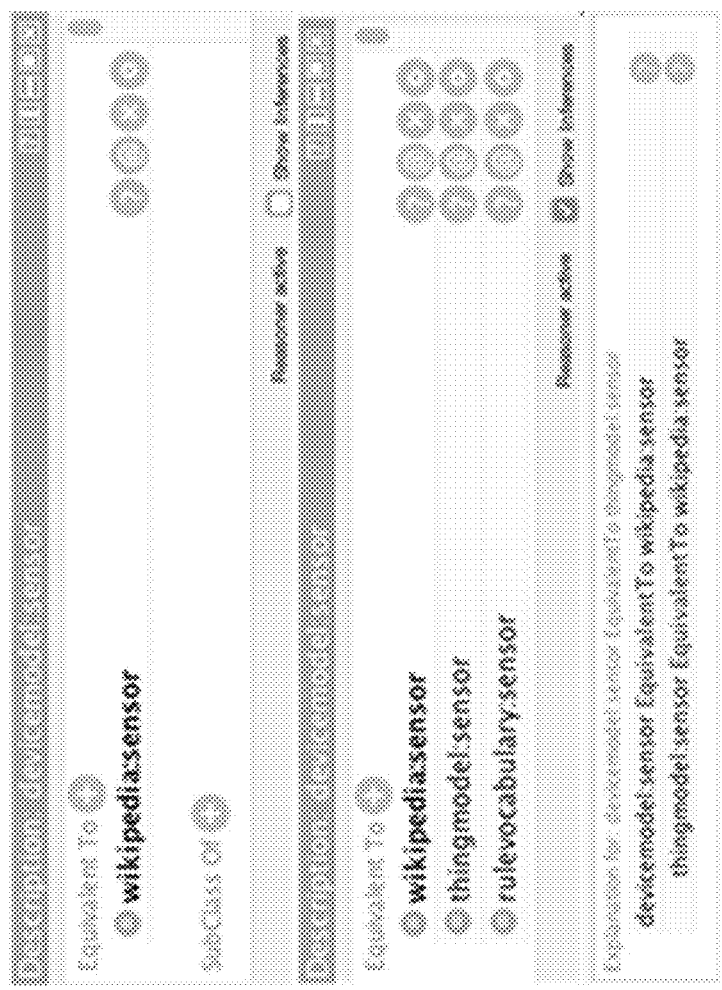
FIG. 6 illustrates an example of how a connection between two different models is generated based on connections of the two models to a common vocabulary.

FIG. 6 illustrates an example of how a connection between two different models is generated based on connections of the two models to a common vocabulary. In the illustrated example, the common vocabulary is identified as a Wikipedia IoT vocabulary. Each of a device model (i.e., the first model) and a thing model (i.e., the second model) have been mapped to the Wikipedia model. As illustrated, in the ontology editor, the device model's "sensor" can be mapped to Wikipedia's "sensor." Because the thing model's "sensor," as well as the rule vocabulary's "sensor" have already been mapped to the same Wikipedia definition, the immediate inference can be made that the device model's "sensor" is therefore equivalent to the thing model's "sensor," and further that the rule vocabulary's "sensor" also is equivalent to the device model and the thing model's "sensor". Using this calculated connection, translations between models is easily available without repetitive and direct linking between each data model.

Figure 7:
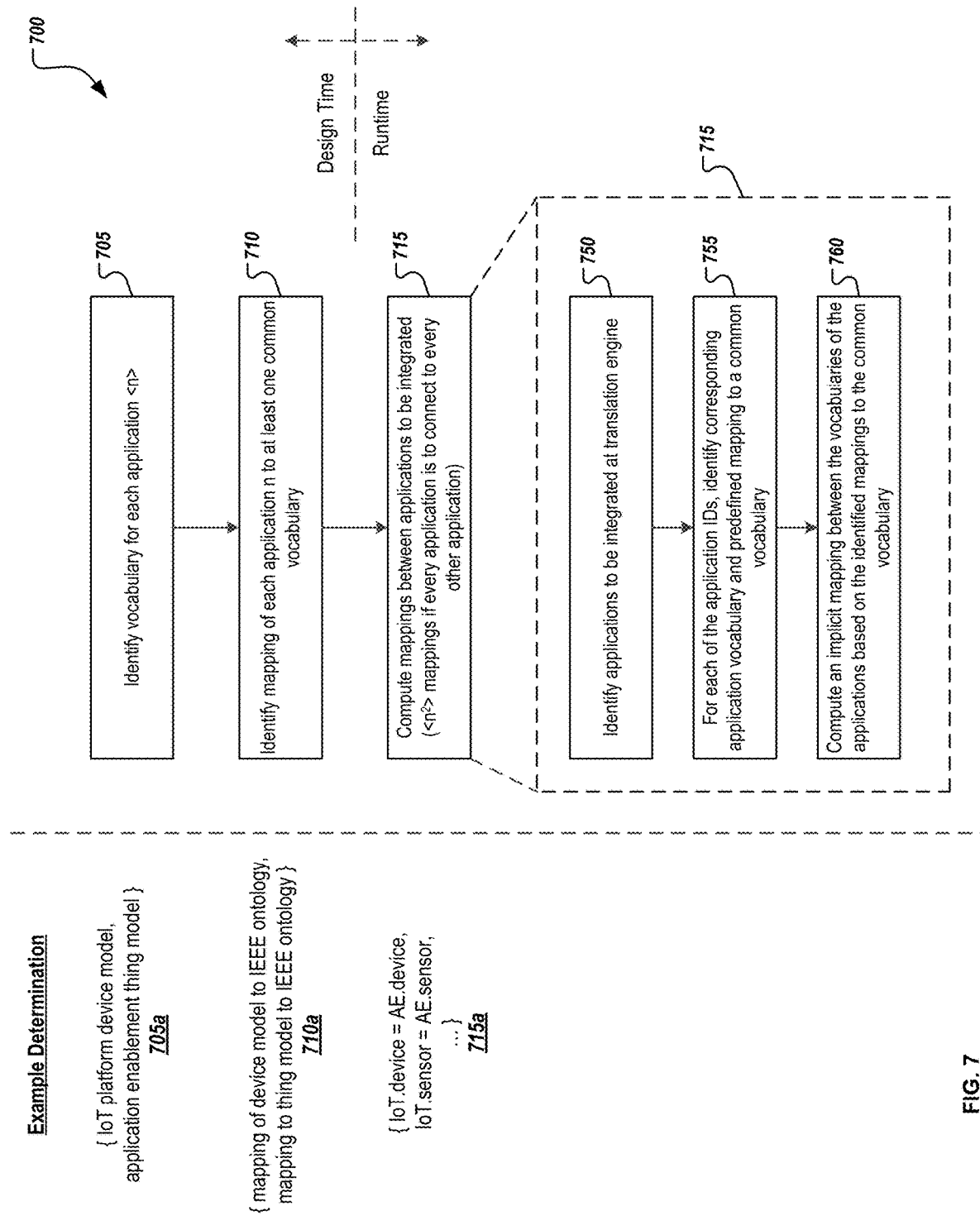
FIG. 7 is a flowchart of an example method for integrating at least two different data models associated with an IoT solution.

FIG. 7 is a flowchart of an example method 700 for integrating at least two different data models associated with an IoT solution using the solution described above. It will be understand that method 700 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 700. In some implementations, the method 700 and related methods are executed by one or more components of the system 500 described above with respect to FIG. 5.

At 705a, which occurs at design time, a vocabulary, or data model, can be identified or otherwise created or crafted for each of the n applications to be integrated into a solution. In some instances, vocabularies for a first set of applications may be identified or crafted at a first time, and further operations may be performed. At a later second time, vocabularies for a second and further sets of applications may be defined and can be integrated into the solution at a later time. These later vocabularies can be added when an administrator or developer extends a solution to link or integrate additional components and/or functionality. The difficulty of adding those further components and functionality is greatly decreased with the current solution, as additional mappings between various components can easily be performed at runtime while only requiring a single mapping of the vocabulary to a common vocabulary. As illustrated in the example, vocabularies can be identified for both an IoT platform device model and an application enablement (AE) thing model.

At 710, each of the n applications to be integrated can be mapped to at least one common vocabulary. If more than two common vocabularies are used, those common vocabularies can then be mapped to one another in order to provide a further connection between any applications. The mapping may be done, for instance, using any ontology editor or other suitable solutions. Again, the mapping process of 710, like that of 705, can be performed at design time. Because only a single mapping of a particular application to a common vocabulary, such as an industry standard vocabulary or a standard setting organization's vocabulary, is needed to allow for the connection to be made, the present solution decreases the number of potential mappings to only be n mappings, where n is the number of applications included in a solution. In instances where two or more common vocabularies are used, one additional mapping may be required between each of the two or more common vocabularies in order to effect the integration. In some instances, each of the common vocabularies themselves may be mapped to a parent or higher-level common vocabulary, such as illustrated in FIG. 4. Alternatively, a specific and direct mapping between two common vocabularies can be used.

As illustrated at 710a, each of the IoT platform device model and the AE thing model can be separately mapped to a particular ontology or common vocabulary. In the illustrated example, the two models are separately mapped to the common vocabulary, and may be mapped by different persons, administrators, or developers. In some instances, the mapping may be to two different common vocabularies (e.g., the IEEE ontology and a Wikipedia ontology). An additional operation may then be needed to map the IEEE ontology and the Wikipedia ontology to a common vocabulary, or one of those ontologies to the other.

At 715, method 700 continues to one or more runtime operations. Specifically, mappings between the identified vocabularies of the n applications are computed in order to integrate those applications and allow further communications. The computation may occur when a particular IoT solution is initialized into a runtime environment, or the computations may occur in response to a particular communication being sent from one application to another. In other words, the calculation may be performed individually to allow the mappings between applications to be calculated. In other instances, a series of connections and intended communications between applications can be analyzed upon deployment.

As illustrated by 715a, once the calculations are made, equivalency between various vocabulary terms and syntaxes can be defined. As shown here, the IoT version of "device" is equivalent to the AE version of "device," and a mapped match is made. Similarly, the IoT version of "sensor" is equivalent to the AE version of "sensor," and a mapped match there can be made. While these terms correspond to each other as "sensor" and "sensor" and "device" and "device," many terms may differ for more detailed and/or specific terms. Based on the connection to the common vocabulary, however, those connections can be easily determined.

The mechanics of 715 can be implemented in any number of suitable ways. FIG. 7 includes a further illustration of one such implementation, and includes operations that may be performed, for example, by a suitable translation service and/or translator. As noted, the operations may be performed for a specific connection between two applications (e.g., the IoT gateway and the application enablement solution), or connections can be calculated throughout a solution based on an analysis of communication patterns.

In the illustrated sub-example, at 750 the applications to be integrated are identified. Identifying the applications can be performed based on the component or application sending a request to a receiving application. In other instances, a payload or header of a received message or communication can identify or include information identifying a particular component from which the message or communication is received. In other instances, a particular port, interface, or other input through which the communication is received may be specific to a particular component. In some instances, the communication or message may further include a specific identification of the common vocabulary to which the sending component is associated. Any other method of identifying or determining the particular application to be integrated or to have information translated may be used. The receiving component, in some instances, can trigger its translation module or engine, or alternatively a remote service providing translations, and can identify itself and the corresponding application.

Once the particular applications are identified, at 755, the corresponding application vocabulary and the predefined mapping to a common vocabulary is identified. In some instances, the corresponding application vocabulary may be limited to the phrases or terms used in a particular communication, and the mappings of those particular terms can then be identified as to how those terms are matched to the common vocabulary.

At 760, based on the identified mappings to the common vocabulary from each of the applications, an implicit mapping between the vocabularies of the applications is computed. Those computed mappings can then be used to translate the particular communication as required in order to allow the different applications to communicate and operate without specific mappings directly between pairs of applications. In instances where the implicit mappings are created in response to a message being sent and received, the implicit mapping may be applied immediately to the received message.

In some instances, an extension may be provided to or included with the illustrated system and methods. In some instances, an editor (e.g., a person reviewing transactions and translations between components, including the computed implicit mappings) can review one or more computed implicit mappings and apply manual corrections, where needed. Such reviews may occur at design time when reviewing logs of communications between components, and/or errors in an error log identifying issues in mappings and/or communications. In some instances, the review may occur at runtime in response to computed mappings causing the issues. In those instances, the editor may be notified of the issue, and can provide a corrected or modified mapping to be used between components.

As described, the method may further include operations to transmit the computed implicit mappings to a review system, service, or component for review and potential correction, either automatically or manually by a reviewer. At the system, one or more corrections to can be made, where appropriate, in case the automatic computation is not 100% correct, or where additional mappings may be needed to complete a translation or mapping. The review system can return any corrections to the computed implicit mappings, where those corrections can then be used moving forward, or for the current interactions. In some instances, the review can be performed at a later design time upon review by a reviewer. In other instances, however, the review can be performed at runtime, including in real-time, where an error in the mapping is identified at runtime. Information about the computed implicit mapping associated with the error can be transmitted to the review system, and the reviewer can provide an updated or corrected mapping. The correction can be provided back to the executing system and used in a current mapping and translation process, allowing the current interaction to be completed.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors, the method comprising:
   identifying, at design time, application-specific vocabularies for each of a plurality of applications, wherein each of the applications is associated with a corresponding vocabulary;
   identifying, at design time and for each application, an explicit mapping of the application-specific vocabulary of a particular application to a corresponding common vocabulary; and
   computing, at runtime, implicit mappings between a first application and a second application to be integrated based on the explicit mapping of the application-specific vocabulary of the first application to the common vocabulary and the explicit mapping of the application-specific vocabulary of the second application to the common vocabulary.

2. The method of claim 1, wherein computing the implicit mappings between the first application and the second application is performed in response to receiving, at the second application, a request including a message from the first application.

3. The method of claim 1, wherein computing the implicit mappings between the first application and the second application is performed in response to a connection being established between the first application and the second application.

4. The method of claim 1, wherein computing the implicit mappings between the first application and the second application comprises:
   identifying the first application and the second application to be integrated;
   identifying the application-specific vocabulary and predefined mapping to the common vocabulary for each of the first application and the second application; and computing the implicit mapping between the vocabularies of the first and second application based on the identified mappings between the identified application-specific vocabulary and the common vocabulary.

5. The method of claim 1, wherein identifying, at design time and for each application, the explicit mapping of the application-specific vocabulary of a particular application to a corresponding common vocabulary comprises identifying, for a first application, an explicit mapping of the application-specific vocabulary of the first application to a first common vocabulary, and identifying, for a second application, an explicit mapping of the application-specific vocabulary of the second application to a second common vocabulary different than the first common vocabulary, and identifying, at design time, a mapping of the first common vocabulary to the second common vocabulary.

6. The method of claim 5, wherein the mapping of the first common vocabulary to the second common vocabulary comprises an explicit mapping of the first common vocabulary to the second common vocabulary, and wherein computing, at runtime, the implicit mappings between a first application and a second application to be integrated based on the explicit mapping of the application-specific vocabulary of the first application to the common vocabulary and the explicit mapping of the application-specific vocabulary of the second application to the common vocabulary comprises computing the implicit mappings between the first application and the second application based on the explicit mapping of the application-specific vocabulary of the first application to the first common vocabulary, the explicit mapping of the application-specific vocabulary of the second application to the second common vocabulary, and the explicit mapping of the first common vocabulary to the second common vocabulary.

7. The method of claim 1, wherein the application-specific vocabularies of the first application comprises a first data model, wherein the application-specific vocabularies of the second application comprises a second data model, and wherein the first data model is different than the second data model.

8. The method of claim 1, wherein no explicit mapping between applications are identified.

9. The method of claim 1, further comprising:
transmitting the computed implicit mappings to a review system for review and potential correction of the computed implicit mappings;
receiving a correction to at least one of the computed implicit mappings from the review system; and
using the correction to the at least one of the computed implicit mappings.

10. The method of claim 9, wherein transmitting the computed implicit mappings to a review system for review and potential correction of the computed implicit mappings occurs in response to an error occurring in relation to a particular computed implicit mapping, and wherein the correction is performed at runtime.

11. A non-transitory, computer-readable medium storing computer-readable instructions executable by a computer and configured to:
identify, at design time, application-specific vocabularies for each of a plurality of applications, wherein each of the applications is associated with a corresponding vocabulary;
identify, at design time and for each application, an explicit mapping of the application-specific vocabulary of a particular application to a corresponding common vocabulary; and
compute, at runtime, implicit mappings between a first application and a second application to be integrated based on the explicit mapping of the application-specific vocabulary of the first application to the common vocabulary and the explicit mapping of the application-specific vocabulary of the second application to the common vocabulary.

12. The computer-readable medium of claim 11, wherein computing the implicit mappings between the first application and the second application is performed in response to receiving, at the second application, a request including a message from the first application.

13. The computer-readable medium of claim 11, wherein computing the implicit mappings between the first application and the second application is performed in response to a connection being established between the first application and the second application.

14. The computer-readable medium of claim 11, wherein computing the implicit mappings between the first application and the second application comprises:
identifying the first application and the second application to be integrated;
identifying the application-specific vocabulary and predefined mapping to the common vocabulary for each of the first application and the second application; and
computing the implicit mapping between the vocabularies of the first and second application based on the identified mappings between the identified application-specific vocabulary and the common vocabulary.

15. The computer-readable medium of claim 11, wherein identifying, at design time and for each application, the explicit mapping of the application-specific vocabulary of a particular application to a corresponding common vocabulary comprises identifying, for a first application, an explicit mapping of the application-specific vocabulary of the first application to a first common vocabulary, and identifying, for a second application, an explicit mapping of the application-specific vocabulary of the second application to a second common vocabulary different than the first common vocabulary, and identifying, at design time, a mapping of the first common vocabulary to the second common vocabulary.

16. The computer-readable medium of claim 11, wherein the mapping of the first common vocabulary to the second common vocabulary comprises an explicit mapping of the first common vocabulary to the second common vocabulary, and wherein computing, at runtime, the implicit mappings between a first application and a second application to be integrated based on the explicit mapping of the application-specific vocabulary of the first application to the common vocabulary and the explicit mapping of the application-specific vocabulary of the second application to the common vocabulary comprises computing the implicit mappings between the first application and the second application based on the explicit mapping of the application-specific vocabulary of the first application to the first common vocabulary, the explicit mapping of the application-specific vocabulary of the second application to the second common vocabulary, and the explicit mapping of the first common vocabulary to the second common vocabulary.

17. The computer-readable medium of claim 11, wherein the application-specific vocabularies of the first application comprises a first data model, wherein the application-specific vocabularies of the second application comprises a second data model, and wherein the first data model is different than the second data model.

18. The computer-readable medium of claim 11, wherein no explicit mapping between applications are identified.

19. A system comprising:
at least one processor; and
a non-transitory computer-readable storage medium coupled to the at least one processor and storing programming instructions for execution by the at least one processor, the programming instructions instruct the at least one processor to:
  identify, at design time, application-specific vocabularies for each of a plurality of applications, wherein each of the applications is associated with a corresponding vocabulary;
  identify, at design time and for each application, an explicit mapping of the application-specific vocabulary of a particular application to a corresponding common vocabulary; and
  compute, at runtime, implicit mappings between a first application and a second application to be integrated based on the explicit mapping of the application-specific vocabulary of the first application to the common vocabulary and the explicit mapping of the application-specific vocabulary of the second application to the common vocabulary.

20. The system of claim 19, wherein computing the implicit mappings between the first application and the second application is performed in response to receiving, at the second application, a request including a message from the first application.

* * * * *